(12) United States Patent
Ogawa et al.

(10) Patent No.: US 8,704,436 B1
(45) Date of Patent: Apr. 22, 2014

(54) HIGH-PRESSURE DISCHARGE LAMP AND PROJECTOR HAVING THE HIGH-PRESSURE LAMP

(71) Applicant: Panasonic Corporation, Osaka (JP)

(72) Inventors: Hiroki Ogawa, Osaka (JP); Yoshiki Kitahara, Osaka (JP); Kazunori Ohta, Osaka (JP); Tamotsu Ishikawa, Shiga (JP); Jun Sakaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/849,038

(22) Filed: Mar. 22, 2013

(30) Foreign Application Priority Data

Nov. 1, 2012 (JP) ................................. 2012-242035

(51) Int. Cl.
*H01J 1/88* (2006.01)
*H01J 19/42* (2006.01)
*H01J 11/00* (2012.01)
*H01J 17/00* (2006.01)

(52) U.S. Cl.
USPC ............ 313/267; 313/238; 313/567; 313/271

(58) Field of Classification Search
None
See application file for complete search history.

(56) References Cited

U.S. PATENT DOCUMENTS

| 6,593,692 B2 * | 7/2003 | Kitahara et al. ............. 313/571 |
| 2003/0020394 A1 | 1/2003 | Kitahara et al. |

FOREIGN PATENT DOCUMENTS

| JP | 2001-325918 | 11/2001 |
| WO | 2012/063151 | 5/2012 |

* cited by examiner

*Primary Examiner* — Natalie Walford
(74) *Attorney, Agent, or Firm* — Greenblum & Bernstein P.L.C.

(57) ABSTRACT

A high-pressure discharge lamp having an electrode including an electrode rod, a melted part and a coil part, and satisfying $$0 < \frac{La}{L} < 0.3,$$

where La denotes an average value of a length in units of mm of an exposed portion of the coil part in an axial direction of the electrode rod, the exposed portion being not covered with the melted part, and L denotes a maximum value of a length in units of mm between a tip of a head of the electrode rod and an opposite edge of the coil part to the melted part, measured in the axial direction.

7 Claims, 14 Drawing Sheets

| La/L | 0.043 | 0.071 | 0.143 | 0.214 | 0.286 | 0.357 | 0.429 |
|---|---|---|---|---|---|---|---|
| Number of coil dropping failures | 0/9 | 0/18 | 0/15 | 0/16 | 0/18 | 3/21 | 2/11 |
| Occurrence rate of the coil dropping failure | 0% | 0% | 0% | 0% | 0% | 14% | 18% |

(a-2) (P/(L×R)=97)

| La/L | 0.043 | 0.071 | 0.143 | 0.214 | 0.286 | 0.357 | 0.429 |
|---|---|---|---|---|---|---|---|
| Number of coil dropping failures | 0/8 | 0/18 | 0/14 | 0/16 | 0/18 | 4/25 | 3/19 |
| Occurrence rate of the coil dropping failure | 0% | 0% | 0% | 0% | 0% | 16% | 16% |

(a-3) (P/(L×R)=83)

| La/L | 0.043 | 0.071 | 0.143 | 0.214 | 0.286 | 0.357 | 0.429 |
|---|---|---|---|---|---|---|---|
| Number of coil dropping failures | 0/8 | 0/8 | 0/8 | 0/7 | 0/11 | 0/16 | 1/20 |
| Occurrence rate of the coil dropping failure | 0% | 0% | 0% | 0% | 0% | 0% | 5% |

(a-4) (P/(L×R)=77)

| La/L | 0.043 | 0.071 | 0.143 | 0.214 | 0.286 | 0.357 | 0.429 |
|---|---|---|---|---|---|---|---|
| Number of coil dropping failures | 0/12 | 0/10 | 0/12 | 0/16 | 0/20 | 0/22 | 0/20 |
| Occurrence rate of the coil dropping failure | 0% | 0% | 0% | 0% | 0% | 0% | 0% |

(b-1) (P/(L×R)=91)

| La/L | 0.1 | 0.2 | 0.25 | 0.3 | 0.35 | 0.4 | 0.5 |
|---|---|---|---|---|---|---|---|
| Number of coil dropping failures | 0/10 | 0/8 | 0/10 | 1/12 | 1/12 | 3/16 | 2/10 |
| Occurrence rate of the coil dropping failure | 0% | 0% | 0% | 8% | 8% | 18% | 20% |

(b-2) (P/(L×R)=87)

| La/L | 0.1 | 0.2 | 0.25 | 0.3 | 0.35 | 0.4 | 0.5 |
|---|---|---|---|---|---|---|---|
| Number of coil dropping failures | 0/8 | 0/8 | 0/12 | 2/16 | 1/8 | 1/6 | 2/10 |
| Occurrence rate of the coil dropping failure | 0% | 0% | 0% | 13% | 13% | 17% | 20% |

(b-3) (P/(L×R)=81)

| La/L | 0.1 | 0.2 | 0.25 | 0.3 | 0.35 | 0.4 | 0.5 |
|---|---|---|---|---|---|---|---|
| Number of coil dropping failures | 0/10 | 0/8 | 0/10 | 0/10 | 0/14 | 2/16 | 2/16 |
| Occurrence rate of the coil dropping failure | 0% | 0% | 0% | 0% | 0% | 13% | 13% |

(b-4) (P/(L×R)=65)

| La/L | 0.1 | 0.2 | 0.25 | 0.3 | 0.35 | 0.4 | 0.5 |
|---|---|---|---|---|---|---|---|
| Number of coil dropping failures | 0/8 | 0/10 | 0/10 | 0/8 | 0/12 | 0/8 | 0/10 |
| Occurrence rate of the coil dropping failure | 0% | 0% | 0% | 0% | 0% | 0% | 0% |

| Normal start-up | 2/30 |
|---|---|
| Start-up failure (Occurrence of electrode breakage) | 28/30 (7/30) |

HIGH-PRESSURE DISCHARGE LAMP AND PROJECTOR HAVING THE HIGH-PRESSURE LAMP

TECHNICAL FIELD

The present disclosure relates to a high-pressure discharge lamp and a projector having the high-pressure discharge lamp.

DESCRIPTION OF THE RELATED ART

Conventionally, there have been a proposal of a high-pressure discharge lamp with a pair of electrodes each having an electrode rod, a melted part, and a coil part (For example, see Patent Literature 1). The electrode rod is made of metal. The melted part is made by melting a portion of a helical metal wire wound around a section of the electrode rod where the head of the electrode rod is included, and then solidifying the portion. The coil part consists of the remaining (unmelted) portion of the helical metal wire.

FIG. 12A is a side view of an electrode 1007 used in such a high-pressure discharge lamp, and FIG. 12B is a cross-sectional view of a high-pressure discharge lamp 1001 using electrodes 1007 and 1009 having the structure shown in FIG. 12A.

The electrode 1007 includes an electrode rod 71, a melted part 1073 and a coil part 1072. The melted part 1073 is made by melting a portion of a helical metal wire wound around a section of the electrode rod 71 where the head of the electrode rod 71 is included, and then solidifying the portion. The coil part 1072 consists of the remaining (i.e. unmelted) part of the helical metal wire. In the electrode 1007, a large portion of the coil part 1072 is exposed and not covered with the melted part 1073.

In the high-pressure discharge lamp 1001, the head of the electrode 1007 and the head of the electrode 1009 face each other within a discharge space 5 of an arc tube 3. The head of the electrode 1007 is connected to an external lead wire 27 via a metal foil 23. The head of the electrode 1009 is connected to an external lead wire 29 via a metal foil 25.

In the high-pressure discharge lamp 1001 having the structure shown in FIG. 12B, a large amount of thermal load is applied to the coil part 1072 particularly when the high-pressure discharge lamp 1001 is driven at a high output power. In some cases, a crack occurs in the coil part 1072. As shown in FIGS. 12A and 12B for example, if a crack occurs in the exposed portion of the coil part 1072 not covered with the melted part 1073, a fragment 1072a of the coil part 1072 might drop onto the internal surface of the wall of the arc tube 3. Hereinafter, the fragment 1072a of the coil part 1072 is referred to as "the coil fragment 1072a". Also, the phenomenon in which the coil fragment 1072a drops onto the internal surface of the wall of the arc tube 3 is referred to as "a coil dropping failure". In particular, when the coil fragment 1072a is located on the area on the wall surface of the arc tube corresponding to the light-emitting areas S1 and S2, the coil fragment 1072a blocks a portion of light emitted from a point between the pair of electrodes 1007 and 1009, and thus the coil fragment 1072a lowers the light-extraction efficiency.

Meanwhile, there has been a conventional proposal of an electrode in which almost the entire surface of the coil part is covered with the melted part (See Patent Literature 2).

FIG. 13 is a cross-sectional view of an electrode 2007 disclosed in Patent Literature 2.

In the electrode 2007, almost the entire surface of the coil part 2072 is covered with the melted part 2073. Therefore, even if the coil part 2072 is damaged, there is no risk that fragments of the coil part 2072 drop from the electrode rod 71.

CITATION LIST

Patent Literature

[Patent Literature 1] Japanese Patent Application Publication No. 2001-325918
[Patent Literature 2] WO 2012/063151A1

SUMMARY

However, in the electrode 2007 having the structure shown in FIG. 13, the melted part 2073 is larger in volume than the coil part 2072 and the electrode rod 71, because almost the entire surface of the coil part 2072 is covered with the melted part 2073. Accordingly, the melted part 2073 is larger in thermal capacity than the coil part 2072 and the electrode rod 71. Therefore, when the electrode 2007 is powered, the melted part 2073 is unlikely to raise its temperature compared to the coil parts 2072 and the electrode rod 71. This causes a start-up failure due to a phenomenon in which discharge does not occur between the respective melted parts of the pair of electrodes when the lamp is powered. Also, as shown in FIG. 14A, discharge H might unexpectedly occur between the melted part 2073 of one of the pair of electrodes 2007 and the electrode rod 71 of the other electrode. Such discharge might break the electrode rod 71.

The inventors conducted tests on start-up performance of an arc tube with a maximum rated power of 380 W, actually using the electrode 2007 having the structure shown in FIG. 13. FIG. 14B shows the results of the tests. As shown in FIG. 14B, only two out of thirty arc tubes started normally, and the remaining twenty-eight arc tubes caused a start-up failure. Furthermore, among the twenty-eight arc tubes causing the start-up failure, seven arc tubes caused the electrode breakage.

In view of the above facts, one non-limiting and exemplary embodiment provides a high-pressure discharge lamp that is capable of preventing degradation of light-extraction efficiency due to fragments of the coil part dropping from the electrode rod, while preventing degradation of the start-up performance.

In one general aspect, the techniques disclosed here feature a high-pressure discharge lamp having an electrode including an electrode rod, a melted part and a coil part, and satisfying $$0 < \frac{La}{L} < 0.3,$$

where La denotes an average value of a length in units of mm of an exposed portion of the coil part in an axial direction of the electrode rod, the exposed portion being not covered with the melted part, and L denotes a maximum value of a length in units of mm between a tip of a head of the electrode rod and an opposite edge of the coil part to the melted part, measured in the axial direction.

With the stated structure, even if a crack occurs in a portion of the coil part where is covered with the melted part, there is no risk that fragments of the coil part drop from the electrode rod. Thus, this structure prevents the degradation of the light-extraction efficiency. Also, since a portion of the coil part is not covered with the melted part, the structure prevents the degradation of the start-up performance as well.

These general and specific aspects may be implemented using a manufacturing method.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 4 is a drawing used for explaining the relationship between the structure of the electrode pertaining to Embodiment 1 and the occurrence rate of the coil dropping failure.

DESCRIPTION OF EMBODIMENTS

Embodiment 1

<1> Structure

Figure 1:
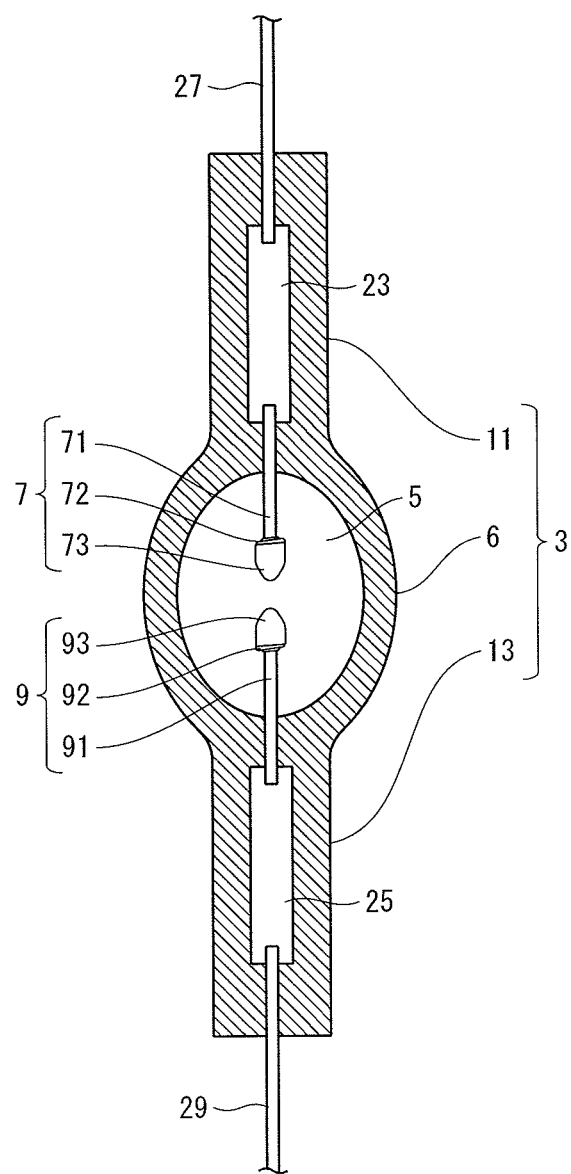
FIG. 1 is a cross-sectional view of a high-pressure discharge lamp pertaining to Embodiment 1.

FIG. 1 is a cross-sectional view of a high-pressure discharge lamp 1 pertaining to the present embodiment.

The high-pressure discharge lamp 1 (hereinafter simply referred to as "the lamp 1") includes an arc tube 3, a pair of electrodes 7 and 9, metal foils 23 and 25 and external lead wires 27 and 29. The electrode structure is composed of the electrodes 7 and 9, the metal foils 23 and 25, and the external lead wires 27 and 29.
<Arc Tube>

The arc tube 3 is formed from a container made of a light-transmissive material such as fused quartz glass. The arc tube 3 includes the light-emitting part 6 and the sealing parts 11 and 13. The external shape of the light-emitting part 6 is spheroidal, and a discharge space 5 is formed inside. The sealing parts 11 and 13 are cylindrical, and extend from both ends of the light-emitting part 6 in the longitudinal direction of the light-emitting part 6. The discharge space 5 encloses mercury, a noble gas, and a halogen gas. Mercury is a light-emitting material. The noble gas is for example an argon, krypton or xenon gas, and serves as a starting aid material. The halogen gas is, for example, an iodine or bromine gas, and it is necessary for causing a halogen cycle within the discharge space 5.

The amount of the enclosed mercury falls within the range of 150 mg/cm$^3$ to 650 mg/cm$^3$. The amount of the enclosed argon gas (at 25° C.) falls within the range of 0.01 MPa to 1 MPa. The amount of the enclosed bromine falls within the range of $1\times10^{-10}$ mol/cm$^3$ to $1\times10^{-4}$ mol/cm$^3$. It is preferable that the amount of the enclosed bromine falls within the range of $1\times10^{-9}$ mol/cm$^3$ to $1\times10^{-5}$ mol/cm$^3$.
<Electrodes>

The electrodes 7 and 9 are rod-like, and one end of each electrode is located inside the discharge space 5 within the light-emitting part 6. Within the discharge space 5, the electrodes 7 and 9 face each other with a predetermined distance therebetween (hereinafter referred to as "the electrode distance"). In view of improvement of the light-extraction efficiency of the lamp 1, it is preferable that the electrode distance falls within the range of 0.5 mm to 1.5 mm. The electrodes 7 and 9 are made of tungsten. The structures of the electrodes 7 and 9 are described in detail later.
<Metal Foils>

As shown in FIG. 1, the metal foils 23 and 25 are respectively sealed with the sealing parts 11 and 13, and they are connected to the bottom ends of the first electrode (i.e. the electrode 7) and the second electrode (i.e. the electrode 9). The metal foils 23 and 25 are made of metal such as molybdenum. Welding can be used for connecting the metal foils 23 and 25 and the electrodes 7 and 9, for example.
<External Lead Wires>

Ends of the external lead wires 27 and 29 are respectively connected to the metal foils 23 and 25. The external lead wires 27 and 29 are made of metal such as molybdenum. Welding can be used for connecting the external lead wires 27 and 29 and the metal foils 23 and 25, for example. The opposite ends to the above-mentioned ends of the external lead wires 27 and 29 extend outward from the sealing parts 11 and 13, and are electrically connected to an external power source (not depicted in the drawing).

Figure 2:
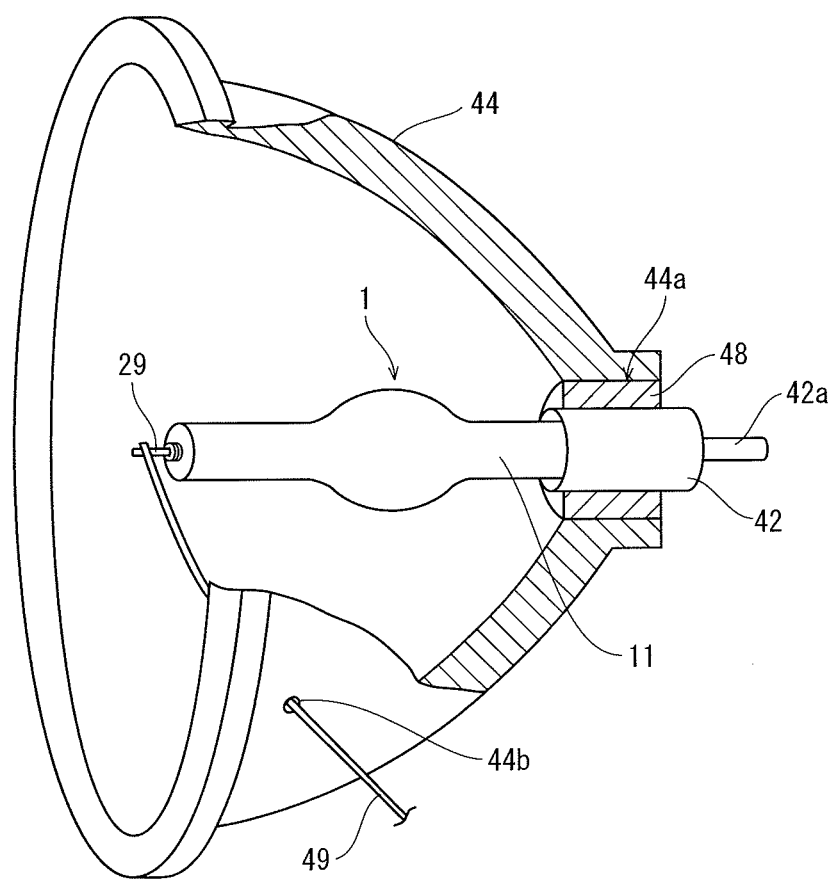
FIG. 2 shows a structure of a lamp unit using the high-pressure discharge lamp pertaining to Embodiment 1, in which a reflection mirror is partially cut away so as to show the inside of the lamp.

FIG. 2 shows a partially-cutaway perspective view of a lamp unit 46 using the lamp 1 pertaining to the present embodiment.

The lamp unit 46 includes the lamp 1, a base 42 and a reflection mirror 44. The base 42 has a shape of a cylinder with a bottom, and is attached to the sealing part 11 of the lamp 1. The reflection mirror 44 is substantially bowl-shaped, and houses the lamp 1.

A terminal 42a, which is used for connection to the power source, is provided to stand on the bottom of the base 42. The terminal 42a is electrically connected to the external lead wire 27 of the lamp 1.

The internal surface of the reflection mirror 44 has a shape of paraboloid of revolution, for example. A multilayer interference film or the like is deposited on the internal surface. The reflection mirror 44 is provided with a through hole 44a in its substantially central portion, and the base 42 is inserted in the through hole 44a. The base 42 is fixed to the reflection mirror 44 with adhesive 48. Near the rim of the reflection mirror 44, a through hole 44b is provided. A power supply line 49 connected to the external lead wire 29 of the lamp 1 passes through the through holes 44b.

<2> Structure of Electrode

The following explains the structure of the electrode 7 in detail. Since the structure of the electrode 9 is the same as the structure of the electrode 7, the following only explains the structure of the electrode 7, and explanation of the structure of the electrode 9 is omitted.

Figure 3A:
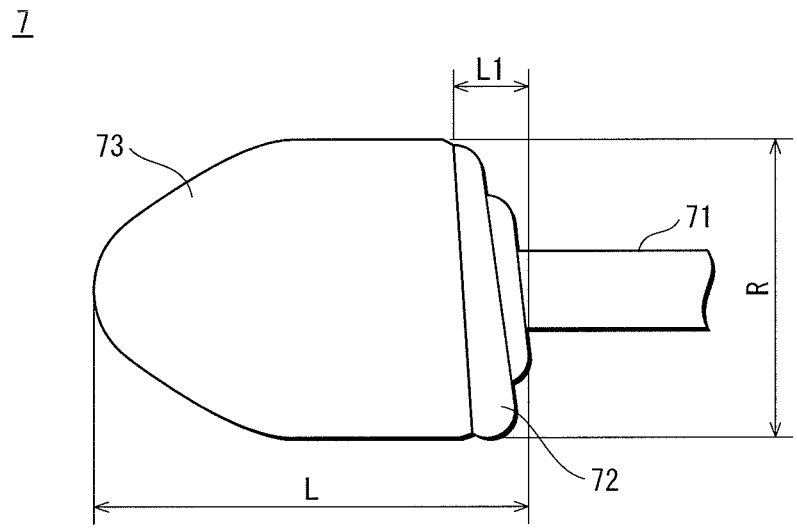
FIG. 3A is a side view of an electrode pertaining to Embodiment 1.
Figure 3B:
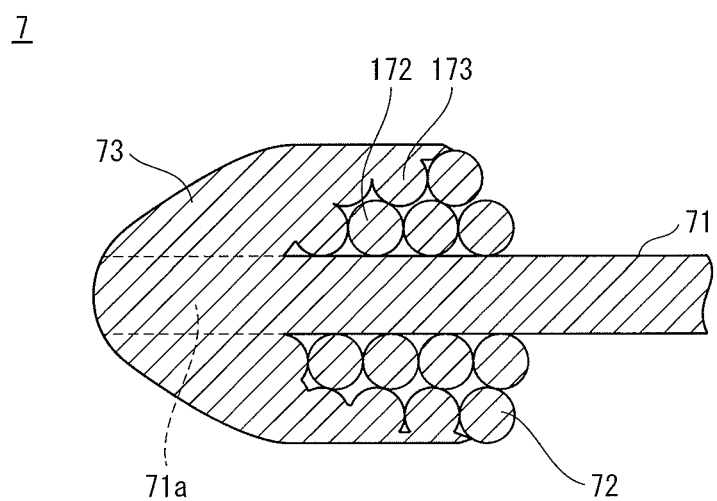
FIG. 3B is a cross-sectional view of the same.

FIG. 3 is a side view of a primary portion of the electrode 7.

The electrode 7 includes an electrode rod 71, a melted part 73 and a coil part 72.

The melted part 73 is formed by melting, and then solidifying, (i) a portion of an outer surface layer and (ii) a portion on the head 71a of the electrode rod 71, of one or more helical metal wires wound around a section of the electrode rod 71 where the head 71a of the electrode rod 71 is included. In the example shown in the drawing, two (inner and outer) helical metal wires, namely the helical metal wires 172 and 173, are wound around the electrode rod 71. Therefore the "outer surface layer" means the helical metal wire 173, which is farther from the electrode rod 71 than the helical metal wire 172 is. The electrode rod 71 has an elongated columnar shape whose cross section is circular or polygonal, for example. A portion of the head 71a of the electrode rod 71 is melted during the formation of the melted part 73, and thus the head 71a is deformed into a roundish shape. The portion composed of the melted part 73 and the head 71a of the electrode rod 71 is formed into substantially semi-spherical, substantially spherical, or substantially conically-shaped. The coil part 72 consists of the remaining (i.e. unmelted) portion of the helical metal wires 172 and 173. A manufacturing method of the electrode 7 is described in detail later. The melted part 73 is formed by melting, and then solidifying, the helical metal wires 172 and 173 such that the melted portion of the helical metal wire 173 is longer than the melted portion of the 172 in the axial direction of the electrode rod 71. Note that the helical metal wire 173 is farther from the electrode rod 71 than the helical metal wire 172 is.

Next, description is given to the relationship between the structures of the electrodes 7 and 9 and the occurrence rate of the coil dropping failure. Here, as described in the Description of the Related Art above, the "coil dropping failure" means the phenomenon in which, when a crack occurs in the exposed portion of the coil part not covered with the melted part, fragments of the coil part drop onto the internal surface of the wall of the arc tube 3.

The inventors of the present invention conducted an experiment to study the occurrence rate of the coil dropping failure by changing the value of La/L and the power applied to the electrodes 7 and 9.

Note that L1 denotes the length of the exposed portion of the coil part 72 that is not covered with the melted part 73, measured in the axial direction of the electrode rod 71. La denotes the average value of L1. L denotes the maximum value of the length between the opposite edge of the coil part 72 to the melted part 73 and the tip of the head 71a of the electrode rod 71, measured in the axial direction of the electrode rod 71.

Tables (a-1) through (a-4) in FIG. 4 show the test results of the arc tube 3 with a maximum rated power of 380 W, and tables (b-1) through (b-4) show the test results of the arc tube 3 with a maximum rated power of 470 W. Regarding the electrode 7 used in the arc tube 3 with a maximum rated power of 380 W, the length L is 2.1 mm and the diameter R of the coil part 72 is 1.725 mm. Regarding the electrode 7 used in the arc tube 3 with a maximum rated power of 470 W, the length L is 3.0 mm and the diameter R of the coil part 72 is 1.725 mm.

Therefore, the 380 W arc tube 3 and the 470 W arc tube 3 are different in the amount of heat generated by the electrodes 7 and 9 even when a same power is applied to the electrodes 7 and 9. Here, the amount of heat generated by the electrodes 7 and 9 is proportional to the input power, and the thermal dissipation depends on the size and shape of the electrodes 7 and 9. Therefore, the temperature of the electrodes 7 and 9 is determined by the amount of heat generated by the electrodes 7 and 9 and their size and shape. Considering the above facts, a normalized power (hereinafter referred to as "the normalized input power") is used in the tables (a-1) through (a-4) in FIG. 4, as a value indicating the input power P to the electrodes 7 and 9. The normalized input power is normalized with respect to the length L and the diameter R of the coil part 72.

The "Number of coil dropping failures" is represented by the number of samples in which the coil dropping failure occurs divided by the number of samples used in the measurement.

As can be seen from the tables (a-1) through (a-3) in FIG. 4, in the case of a high-pressure discharge lamp with a maximum rated power of 380 W under the condition that the normalized input power falls within the range of 83 W/mm² to 105 W/mm², it is possible to prevent the coil dropping failure by setting the value of La/L to be less than 0.3. Furthermore, as shown in the table (a-4) in FIG. 4, the coil dropping failure does not occur at all regardless of the value of La/L when the normalized input power is equal to or less than 77 W/mm².

As can be seen from the tables (b-1) through (b-3) in FIG. 4, in the case of a high-pressure discharge lamp with a maximum rated power of 470 W under the condition that the normalized input power falls within the range of 81 W/mm² to 91 W/mm², it is possible to prevent the coil dropping failure by setting La/L to be less than 0.3. Furthermore, as shown in the table (b-4) in FIG. 4, the coil dropping failure does not occur at all regardless of the value of La/L when the normalized input power is equal to or less than 65 W/mm².

On the other hand, when the entire surface of the coil part 72 is covered with the melted part 73, the surface temperature of the electrode 7 does not easily rise, which degrades the start-up performance of the lamp 1. This is because the volume of the melted part 73 in such a case is necessarily larger than the value of the coil part 72, and the thermal capacity of the melted part 73 is larger than the thermal capacity of the coil part 72. Thus, it is necessary to remain at least a small portion of the coil part 72 uncovered with the melted part 73 in order to secure an area that is likely to raise its temperature and thereby prevent the degradation of the start-up performance of the lamp 1. Therefore, the value of La/L at least should be greater than 0.

Considering all the above conditions, the electrode 7 pertaining to the present embodiment fulfills the following Formula 1 with respect to the length La and the length L in order to prevent the occurrence of the coil dropping failure and the degradation of the start-up performance of the high-pressure discharge lamp 1:

$$0 < \frac{La}{L} < 0.3 \qquad \text{[Formula 1]}$$

Furthermore, when L1 denotes the length in units of mm of the exposed portion of the helical metal wires that is not covered with the melted portion, measured in the axial direction of the electrode rod 71, the following Formula 2 stabilizes the start-up performance independently from the orientation of the coil part after the lamp 1 is being assembled, in terms of the angle of rotation about the electrode rod.

$$\left|\frac{L1 - La}{L}\right| < 0.05 \quad \text{[Formula 2]}$$

The edge of the melted part 73 closer to the exposed portion of the coil part 72 has, for example, a substantially straight shape all around the axis of the electrode rod 71.

Furthermore, considering the test results explained above, the advantageous effect is particularly remarkable when the input power between the electrodes 7 and 9 is set to fulfill the following Formula 3.

$$\frac{P}{L \times R} \geq 80 \quad \text{[Formula 3]}$$

In the formula above, R denotes the diameter in units of mm of the coil part 72, and P denotes the input power in units of W applied to the pair of electrodes 7 and 9.

The inventors also conducted an experiment to study the relationship between the shape of each of the electrodes 7 and 9 and the input power P.

Using the arc tube 3 with a maximum rated power of 470 W, the inventors observed the shapes of the electrodes 7 and 9 while changing the normalized input power within the range of 101.3 W/mm$^2$ to 129.7 W/mm$^2$. The inventors obtained the results that the heads of the electrodes 7 and 9 get damaged when the normalized input power exceeds 124.2 W/mm$^2$.

In other words, the shapes of the electrodes 7 and 9 can be maintained by setting the input power P between the electrodes 7 and 9 so that the normalized input power will be equal to or less than approximately 124 W/mm$^2$.

Furthermore, regarding thirty arc tubes with a maximum rated power of 380 W from among the arc tubes 3 pertaining to the present embodiment, the inventors checked whether or not the start-up failure occurs. However, the start-up failure did not occur in any of the thirty arc tubes. Such results can be consider to show that in the electrode 7 pertaining to the present embodiment, since a portion of the coil part 72 is not covered with the melted part 73, the degradation of the start-up performance is prevented.

<3> Manufacturing Method of Electrodes

The following describes a manufacturing method of the electrode 7. Since the electrode 9 can be manufactured by the same method as the electrode 7, explanation thereof is omitted.

FIGS. 5A through 5C and FIGS. 6A and 6B show the manufacturing method of the electrode 7.

Figure 5A:
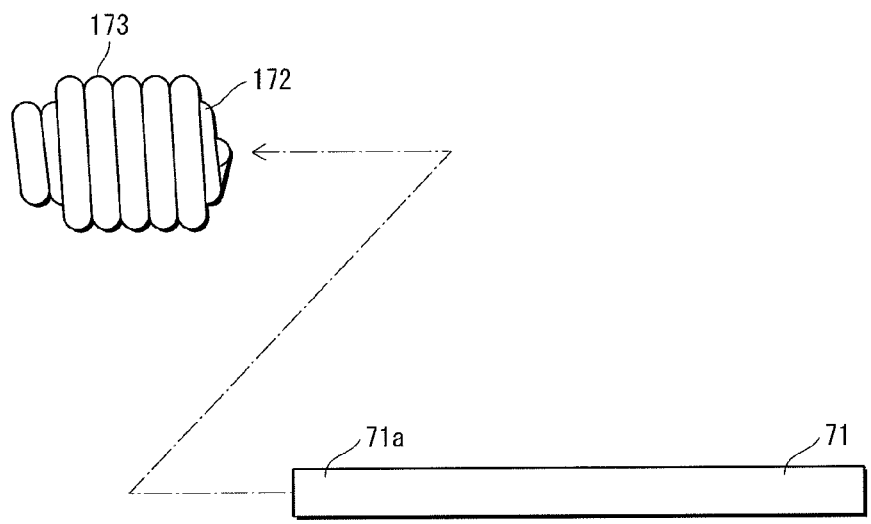
FIGS. 5A through 5C are drawings used for explaining a manufacturing method of the electrode pertaining to Embodiment 1.

First, as shown in FIG. 5A, two layers of metal wires, namely the helical metal wires 172 and 173, are wound around the section of the electrode rod 71 where the head 71a is included. The electrode rod 71 is made for example of tungsten wire having an outside diameter of 0.525 mm. The helical metal wires 172 and 173 are made for example of tungsten wire having an outside diameter of 0.3 mm.

Figure 5B:
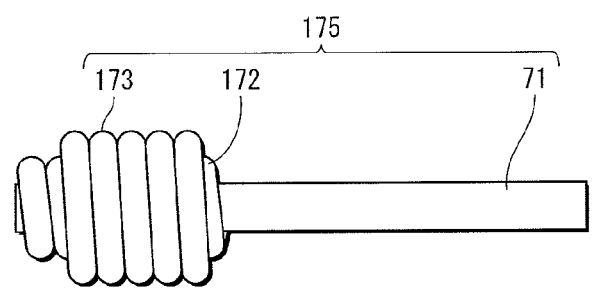

As shown in FIG. 5B, the helical metal wires 172 and 173 are provisionally fixed to the section of the electrode rod 71 including the head 71a, due to the force generated by the helical metal wires 172 and 173 in the direction of reducing the diameters thereof. Thus, an electrode base member 175 as a base of the electrode 7 is formed.

Figure 5C:
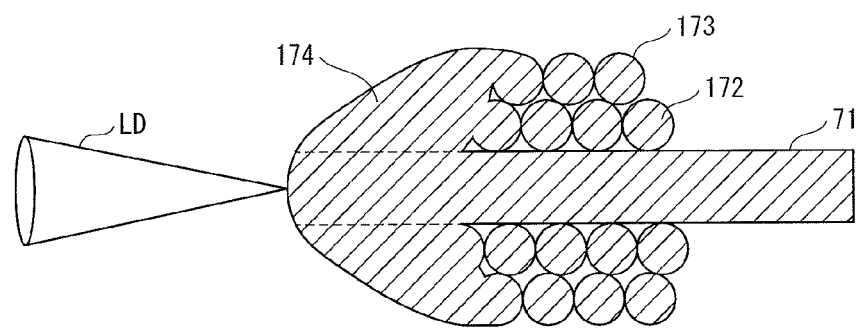

Next, as shown in FIG. 5C, the head of the electrode base member 175 is irradiated with a laser beam LD emitted from a YAG laser or the like. The laser beam LD melts a portion 174 of the helical metal wires 172 and 173 on the head 71a of the electrode rod 71. The laser beam LD also melts a portion of the head 71a of the electrode rod 71 and rounds the head 71a.

Figure 6A:
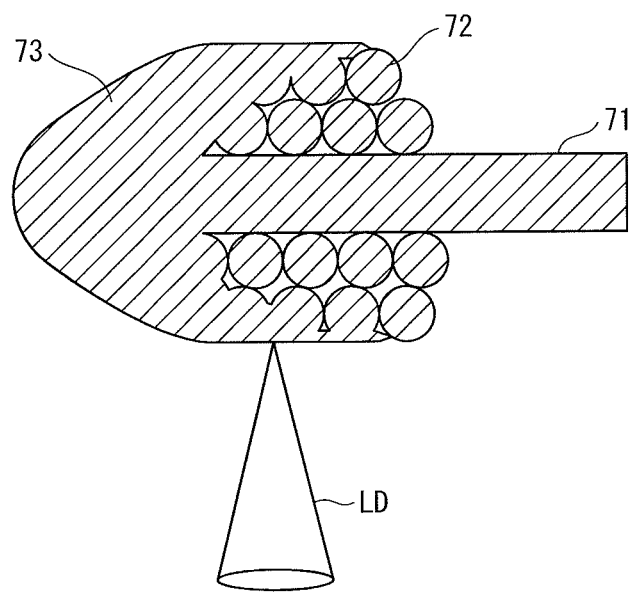
FIGS. 6A and 6B are drawings used for explaining a manufacturing method of the electrode pertaining to Embodiment 1.
Figure 6B:
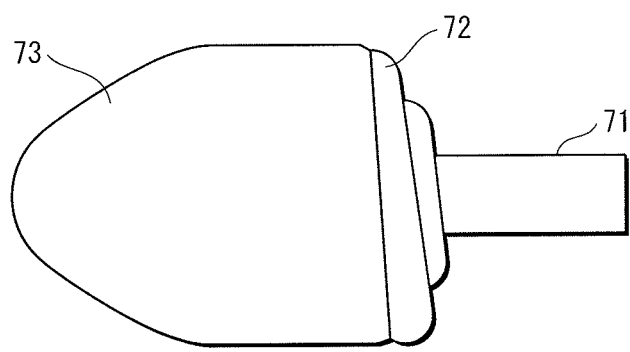

Subsequently, as shown in FIG. 6A, the helical metal wire 172 is irradiated with the laser beam LD from a side of the electrode base member 175. As a result, the laser beam LD further melts the helical metal wire 173 to form the melted part 73, and the melted part 73 extends toward the bottom end of the electrode rod 71 so as to cover the unmelted portion of the helical metal wire 172. Here, as shown in FIG. 6A and FIG. 6B, the melted portion of the helical metal wires 172 and 173 constitutes the melted part 73, and the unmelted portion constitutes the coil part 72. Here, it is possible to fulfill Formula 2 described above and form the edge of the melted part 73 in a substantially straight shape by rotating the electrode base member 175 about the axis of the electrode rod 71 while irradiating the electrode base member 175 with the laser beam LD sideways.

<4> Summary

In conclusion, in the lamp 1 pertaining to the present invention, the length La and the length L fulfills the relationship represented by Formula 1 described above. Note that L1 denotes the length in units of mm of the exposed portion of the coil part 72 that is not covered with the melted part 73, measured in the axial direction of the electrode rod. La denotes the average value of L1. For example, La is the average of L1 measured at at least two different measurement points on the circumference of the coil part 72. However, it is preferable that the measurements points include at least the point at which L1 takes the maximum value and the point at which L1 takes the minimum value. Furthermore, the minimum value of L1 may be 0. That is, L1 may be measured at a point on the coil part 72 where is covered with the melted part 73. L denotes the maximum value of the length in units of mm between the opposite edge of the coil part 72 to the melted part 73 and the opposite edge of the melted part 73 to the exposed portion of the coil part 72, measured in the axial direction of the electrode rod 71. When Formula 1 is fulfilled, even if a crack occurs in a portion of the coil part 72 where is covered with the melted part 73, there is no risk that fragments of the coil part 72 drop from the electrode rod 71. Thus, the present embodiment prevents the degradation of the light-extraction efficiency. Also, since a portion of the coil part 72 is not covered with the melted part 73, the present embodiment prevents the degradation of the start-up performance.

Embodiment 2

Figure 7:
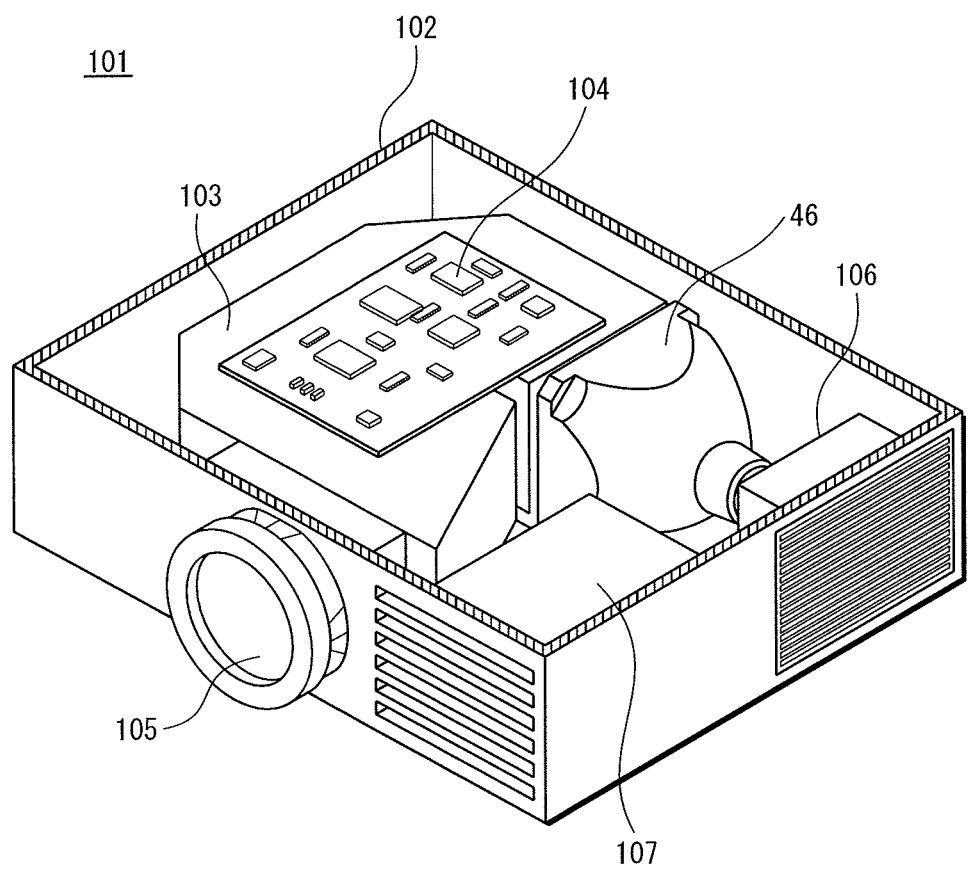
FIG. 7 is a perspective view of a projector pertaining to Embodiment 2.
Figure 8:
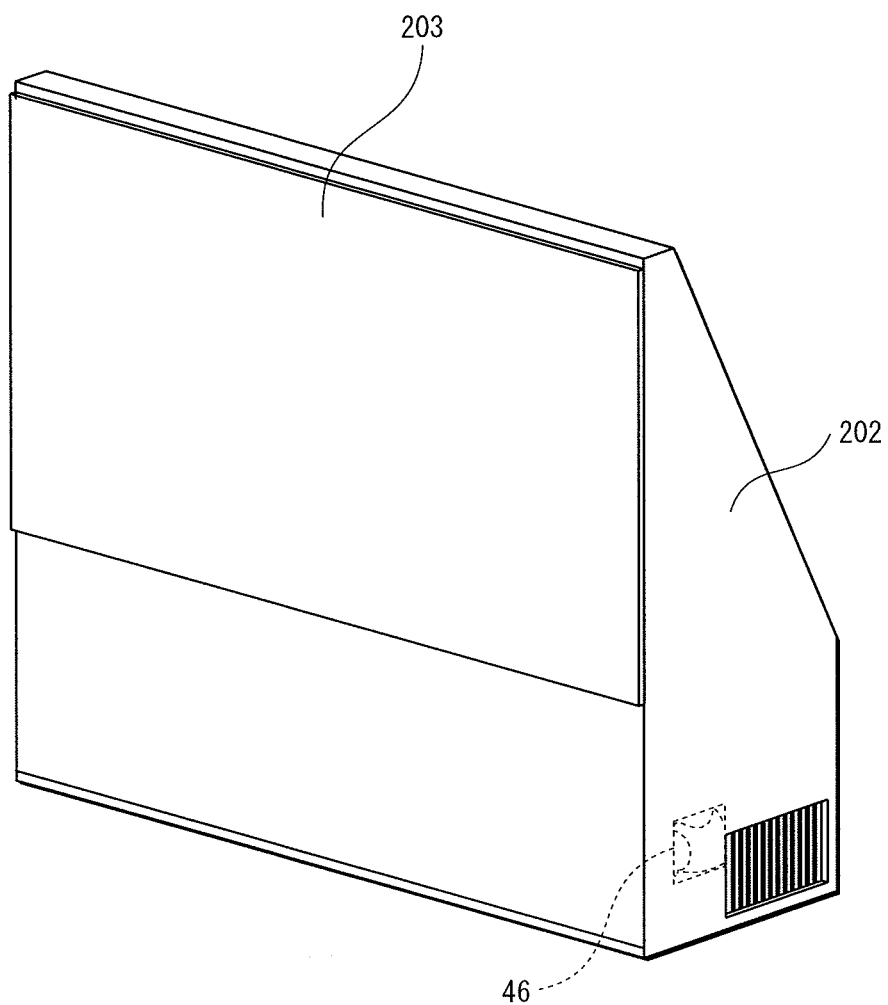
FIG. 8 is a perspective view of a projector pertaining to Embodiment 2.

FIG. 7 and FIG. 8 are perspective views of projectors 101 and 201 pertaining to the present embodiment, respectively. Note that FIG. 7 shows the projector 101 whose housing 102 is not covered with its top panel.

The projector 101 is a front projector, and has as function to project an image onto a screen (not depicted in the drawing) placed in front of the projector 101.

As shown in FIG. 7, the projector 101 includes a rectangular box housing 102, which houses therein a lamp unit 46, an optical unit 103, a control unit 104, a projection lens 105, a cooling fan unit 106 and a power source unit 107.

The optical unit 103 includes an image formation unit, an light-combining unit, and an illumination unit. The image formation unit forms an image by polarization of input light. The light-combining unit combines the output light rays from the image formation unit. The illumination unit inputs the light output from the light-combining unit and the lamp unit 46 into the image formation unit.

The illumination unit has color filters of three colors (not depicted in the drawing) or the like, and separates the light from the lamp unit 46 into light rays of three primary colors, and input the light rays into the image formation unit. The light-combining unit combines the light rays of three primary colors separated by the image formation unit, and thereby forms a full-color image. The control unit 104 controls the image formation unit and the light-combining unit included in the optical unit 103.

The projection lens 105 magnifies and projects the image generated by the optical unit 103.

The power source unit 107 converts power supplied from a commercial power source into appropriate power for the control unit 104, the lamp unit 46, and so on, and supplied the converted power to the control unit 104 and the lamp unit 46.

As shown in FIG. 8, the projector 201 is a rear projector, and a lamp unit 46, an optical unit, a projection lens, a mirror, and a lighting device (each not depicted in the drawing) are housed in a housing 202.

The image projected by the projection lens and reflected off the mirror is projected from the rear side of a transmissive screen 203.

Modifications (1) In Embodiment 1, the edge of the melted part 73 closer to the exposed portion of the coil part 72 is formed in a substantially straight shape all around the axis of the electrode rod 71. However, the shape of the edge of the melted part 73 is not limited to a straight shape in so far as Formula 2 is fulfilled.

Figure 9A:
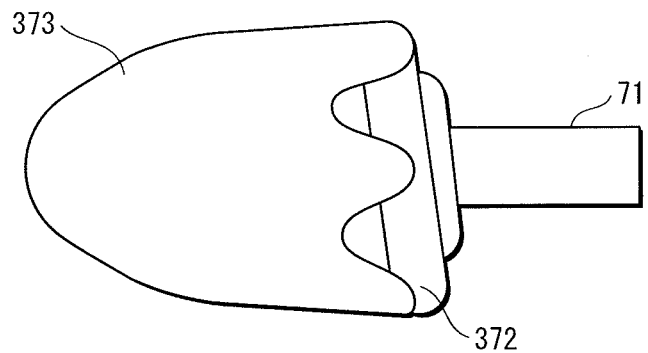
FIGS. 9A and 9B are side views of an electrode pertaining to a modification example.
Figure 9B:
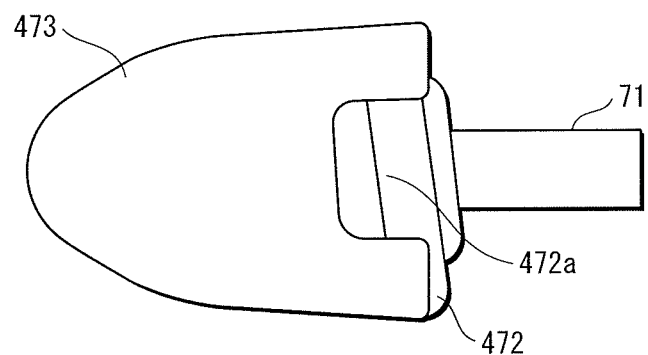

FIGS. 9A and 9B show the shapes of electrodes 307 and 407 pertaining to the present modification.

As shown in FIG. 9A, in the electrode 307 pertaining to an example of the present modification, the edge of the melted part 373 closer to the exposed portion of the coil part 372 has a wavy shape.

As shown in FIG. 9B, in the electrode 407 pertaining to an example of the present modification, a portion 472a of the edge of the melted part 373 closer to the exposed portion of the coil part 372 is cut out in a rectangular shape like an aperture.

With such structures, compared with the electrode 7 pertaining to Embodiment 1, the exposed portions of the coil parts 372 and 472 not covered with the melted parts 373 and 473 are partially closer to the edges of the melted parts 373 and 473 opposite to the exposed portion of the coil parts 372 and 472. Therefore, a high-pressure discharge lamp using two electrodes having either structure described above is capable of further preventing the coil dropping failure without degrading the start-up performance, because the minimum distance between the exposed portions of the coil parts not covered with the melted parts is shorter than in the high-pressure discharge lamp 1.

(2) In Embodiment 1 and Modification (1), the length of the exposed portion of the coil part 72 not covered with the melted part 73 in the axial direction of the electrode rod 71 fulfills Formula 2 described above. However, the present invention is not limited in this way. For example, the length in the axial direction of the electrode rod 71 measured at some points on the exposed portion of the coil part 72 not covered with the melted part 73 may not fulfill Formula 2 described above.

Figure 10:
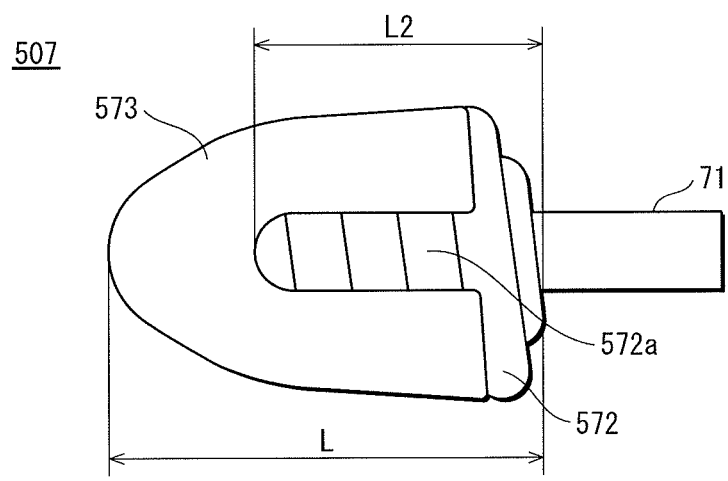
FIG. 10 is a side view of an electrode pertaining to a modification example.

FIG. 10 shows an electrode 507 pertaining to the present modification.

In the electrode 507, when L2 denotes the maximum value of the length in units of mm of an exposed portion 572a of the coil part 572 not covered with the melted part 573 measured in the axial direction of the electrode rod 71, L and L2 fulfill the relationship represented by Formula 4 below.

$$0.5 < \frac{L2}{L} \qquad \text{[Formula 4]}$$

That is, the length L2 is greater than a half of the length L. As mentioned above, L2 denotes the maximum value of the length in units of mm of the exposed portion 572a of the coil part 572 not covered with the melted part 573, measured in the axial direction of the electrode rod 71. L denotes the maximum value of the length in units of mm between the edge of the head of the electrode rod 71 and the edge of the coil part 572 that is opposite to the melted part 573, measured in the axial direction of the electrode rod 71.

With such structures, compared with the electrode 7 pertaining to Embodiment 1 and the electrodes 307 and 407 pertaining to Modification (1), the exposed portion 572a of the coil part 572 not covered with the melted part 573 is partially closer to the edge of the melted part 573 opposite to the exposed portion 572a of the coil part 572 (i.e. closer to the head of the electrode rod 71). Therefore, a high-pressure discharge lamp using two electrodes having any of the above-described structures is capable of further preventing the coil dropping failure without degrading the start-up performance, because the minimum distance between the exposed portions of the coil parts not covered with the melted parts is shorter than in the high-pressure discharge lamp 1.

(3) In Embodiment 1, the electrode 7 is formed from two layers of metal wires, namely the helical metal wires 172 and 173. However, the number of the layers of helical metal wires used for forming the electrode 7 is not necessarily two. Also, the number of windings of the helical metal wires 172 and 173 between the edge of the coil part 72 opposite to the melted part 73 and the edge of the melted part 73 opposite to the exposed portion of the coil part 72 is not limited to any particular number.

Figure 11:
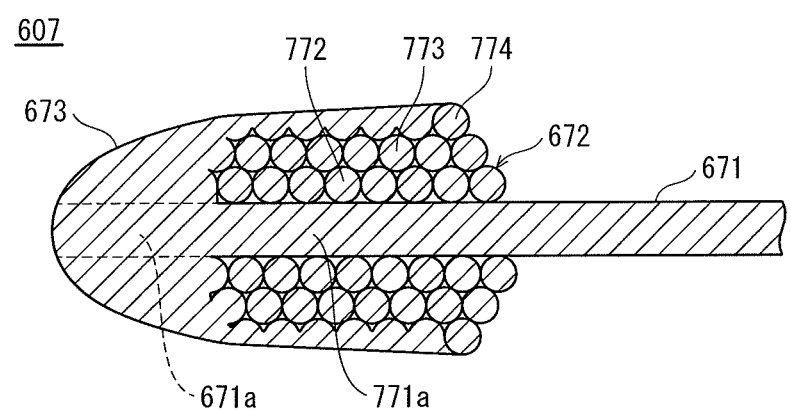
FIG. 11 is a cross-sectional view of an electrode pertaining to a modification example.
Figure 12A:
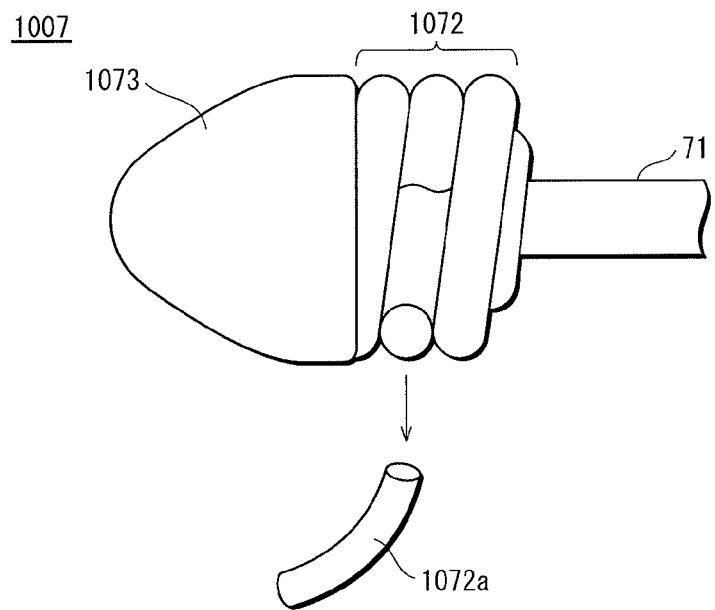
FIG. 12A is a side view of a conventional electrode.
Figure 12B:
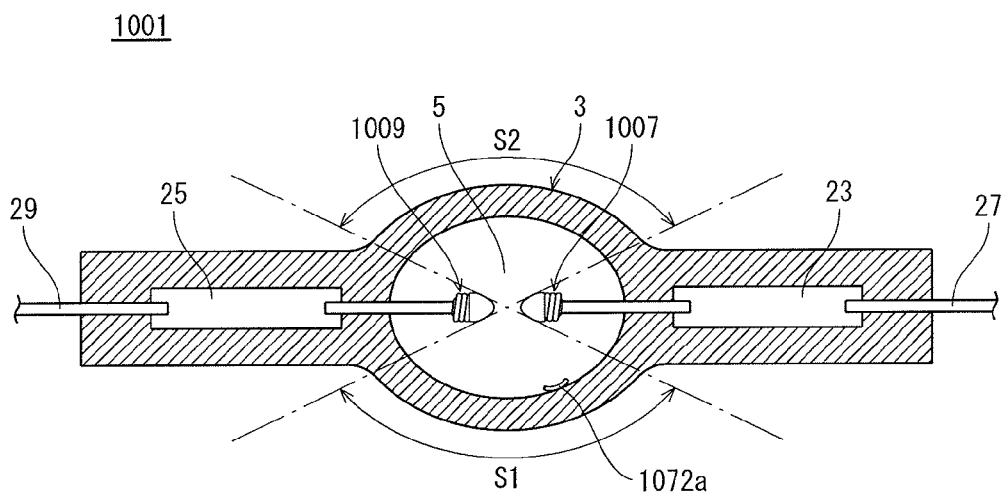
FIG. 12B is a cross-sectional view of a conventional high-pressure discharge lamp.
Figure 13:
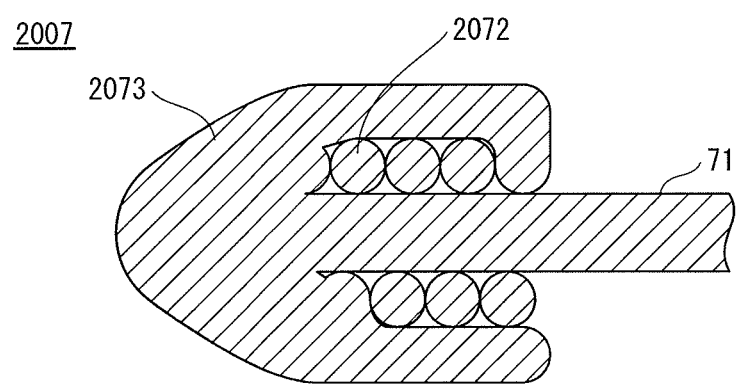
FIG. 13 is a cross-sectional view of another conventional electrode disclosed in Patent Literature 2.
Figures 14A, 14B:
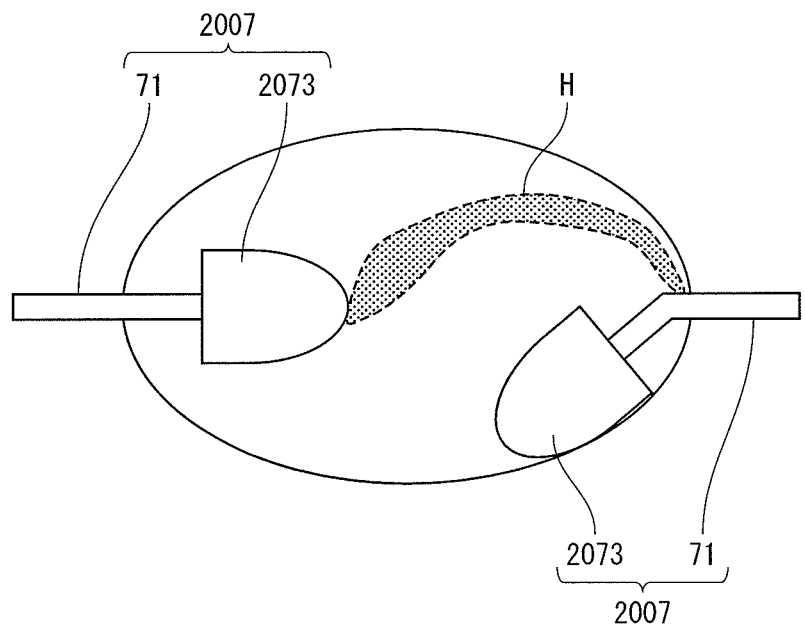
FIG. 14A explains a phenomenon occurring in a conventional lamp.
FIG. 14B shows results of a start-up performance test conducted on the conventional lamp.

FIG. 11 is a cross-sectional view of an electrode 607 pertaining to the present modification.

A melted part 673 is formed by melting, and then solidifying, (i) a portion of an outer surface layer and (ii) a portion located around the head 671a of the electrode rod 671, of three layers of helical metal wires, namely helical metal wire 772, 773 and 774, wound around a section of the electrode rod 671 where the head 671a of the electrode rod 71 is included. The coil part 672 consists of the remaining (i.e. unmelted) portion of the helical metal wires 772, 773 and 774. The melted portion of the outermost helical metal wire among the helical metal wires 772, 773 and 774, namely the helical metal wire 774, is longer than the melted portions of the other helical metal wires 772 and 773 in the axial direction of the electrode rod 671.

With the stated structure, compared with the electrode 7 pertaining to Embodiment 1, the diameter of the coil part 672 increases as the number of the layers of the helical metal wires increases, and accordingly the surface area of the exposed portion of the coil part 672 not covered with the melted part 673 increases. Therefore, a high-pressure discharge lamp using the electrode 607 having the stated structure achieves higher start-up performance than the high-pressure discharge lamp 1 using the electrode 7.

Note that the number of layers of helical metal wires is not limited to three, and may be four or more.

REFERENCE SIGNS LIST

1 High-pressure discharge lamp (Lamp)
3 Arc tube
5 Discharge space
7, 9, 307, 407, 507, 607 Electrode
71, 671 Electrode rod
72, 372, 472, 572, 672 Coil part
73, 373, 473, 573, 673 Melted part
101, 201 Projector

The invention claimed is:

1. A high-pressure discharge lamp comprising:
an arc tube within which a discharge space is formed; and
a pair of electrodes whose respective heads face each other within the discharge space,
each electrode including:
an electrode rod;
a melted part formed by melting, and then solidifying, particular portions of at least one helical wire wound around a section of the electrode rod where a head of the electrode rod is included, the particular portions including a portion of an outer surface layer of the at least one helical wire and a portion of the at least one helical wire located around the head of the electrode rod; and
a coil part consisting of an unmelted portion of the at least one helical wire, and partially covered with the melted part, wherein $$0 < \frac{La}{L} < 0.3$$

where La denotes an average value of a length in units of mm of an exposed portion of the coil part in an axial direction of the electrode rod, the exposed portion being not covered with the melted part, and L denotes a maximum value of a length in units of mm between a tip of the head of the electrode rod and an opposite edge of the coil part to the melted part, measured in the axial direction.

2. The high-pressure discharge lamp of claim 1, wherein
the melted part is formed by melting, and then solidifying, particular portions of N helical wires wound in layers around the section of the electrode rod, N being equal to or greater than 2,
the outer surface layer is an outermost helical wire among the N helical wires,
the particular portions include a portion of the outermost helical wire and portions of the rest of the N helical wires located around the head of the electrode rod, and
the portion of the outermost helical wire is longer than the portions of the rest of the N helical wires in the axial direction.

3. The high-pressure discharge lamp of claim 1, wherein $$\left|\frac{L1 - La}{L}\right| < 0.05$$

where L1 denotes the length in units of mm of the exposed portion in the axial direction.

4. The high-pressure discharge lamp of claim 2, wherein $$\left|\frac{L1 - La}{L}\right| < 0.05$$

where L1 denotes the length in units of mm of the exposed portion in the axial direction.

5. The high-pressure discharge lamp of claim 2, wherein $$0.5 < \frac{L2}{L}$$

where L2 denotes a maximum value of the length in units of mm of the exposed portion in the axial direction.

6. The high-pressure discharge lamp of claim 4, wherein $$\frac{P}{L \times R} \geq 80$$

where R denotes a diameter in units of mm of the coil part and P denotes a power in units of W applied to the pair of electrodes.

7. A projector having the high-pressure discharge lamp of claim 1.

* * * * *